United States Patent [19]
Adrian et al.

[11] 3,711,856
[45] Jan. 16, 1973

[54] POSITION LOCATING SYSTEM

[75] Inventors: Donald J. Adrian, Corona; Lawrence E. Christensen, Riverside, both of Calif.

[73] Assignee: Astrophysics Research Corporation, Los Angeles, Calif.

[22] Filed: Aug. 17, 1970

[21] Appl. No.: 64,304

[52] U.S. Cl. .......................343/103, 325/9, 343/105
[51] Int. Cl................................................G01s 1/24
[58] Field of Search ...................325/9; 343/103, 105

[56] References Cited

UNITED STATES PATENTS

| | | |
|---|---|---|
| 3,471,856 | 10/1969 | Laughlin, Jr. et al. .........343/105 R X |
| 3,534,367 | 10/1970 | Laughlin et al. ..............343/105 R X |
| 2,940,076 | 6/1960 | Bissett et al. ...................343/100 CL |

Primary Examiner—Benjamin A. Borchelt
Assistant Examiner—Richard E. Berger
Attorney—Sokolski & Wohlgemuth

[57] ABSTRACT

Signals transmitted from radio navigation transmitters of the type such as utilized in the Decca, Omega, and Loran navigation systems, are received in mobile locations such as on a vehicle or ambulatory personnel. These signals are translated from their original frequency to frequencies within the audio band pass of voice communication equipment, the original phase relationship being retained in the translation. The translated signals are combined with the normal communication signals of the communications equipment and thus included in the modulation of the transmissions of this equipment. The translated navigation signals are then separated from the audio output at a central receiving location and processed to provide information as to the mobile position.

10 Claims, 5 Drawing Figures

POSITION LOCATING SYSTEM

This invention relates to a position location system and more particularly to such a system utilizing long range radio navigation signals transmitted from fixed locations which are received and retransmitted from mobile locations to a central station for processing to determine the positions of the mobile locations.

There are many situations where it is necessary to maintain information at a central location of the positions of a plurality of mobile units in the field. Such monitoring becomes particularly important in the control of emergency vehicles such as police cars and fire trucks. It also however has numerous commercial applications, such as in taxicab, delivery truck and service vehicle control. Surveillance of this type also is important in military applications in providing central information as to the location not only of military vehicles but also foot personnel.

Radio position locating systems in the past have generally utilized processing equipment located at the remote unit, which processed the various radio signals received from the fixed navigational stations and provided readout information as to the remote location of the unit for local readout and/or retransmission to a central location. These types of systems have a shortcoming in that they require complicated and expensive processing equipment on each one of the units in the field. This has severe drawbacks where there are numerous such units, such as in the case of police cars, taxicab fleets, and commercial delivery and service vehicles, in view of the great expense in providing and maintaining numerous such sophisticated units. Further, the maintenance and calibration of such complicated processing equipment in the field poses a distinct problem as to the reliability and dependability of the system.

Certain systems have been developed in the prior art to obviate the necessity for having complicated processing equipment on the field units. These prior art units, however, have generally required special radio navigation transmitters for utilization therewith and cannot make use of existing transmitters set up for use with other navigational systems. Other systems have been disclosed in the prior art for determining the location of mobile units by receiving and retransmitting in their raw form existing radio navigational signals received from transmitters of the Omega or Loran type. These systems, however, have the shortcoming in that they do not provide means for translating the received signals to a low frequency audio range so that they can be placed on the carrier of a normal voice communications transmitter within a normal audio communications channel.

The system of this invention provides distinct advantages over and obviates many of the shortcomings of prior art position locating systems in providing means at each mobile unit for translating existing radio navigational signals to a low audio frequency form for retransmission on a normal communications transmitter to a central location where the signals are processed to provide a readout as to the position of the remote unit. The equipment at the mobile location is relatively simple and economical and has no intricate circuitry which would make for unusual maintenance or adjustment problems, the more sophisticated equipment needed for processing and readout being located at the central location where it can more readily be maintained and adjusted for optimum operation. Further, the system of the invention requires no special transmitting equipment at the remote location and no additional communications channel beyond that utilized for normal voice communication, the navigational signals being multiplexed along the normal voice communication signals.

It is therefore the principal object of this invention to provide a radio position location system which utilizes existing radio navigational signals and relatively simple, reliable and economical equipment at the remote locations which translates the navigational signals for transmission in a normal voice communications channel to a central station for processing.

Other objects of the invention will become apparent from the following description taken in connection with the accompanying drawings of which:

Briefly described, the system of the invention includes a navigational signal receiver located on a mobile unit which receives a plurality of signals transmitted from fixed transmitting stations which may be part of a conventional navigational system such as of the Decca, Omega, or Loran type, or may be in a network specially established for use with the system of the invention. The separate signals received from each of the transmitters are translated in a signal translator to frequencies in the low frequency audio range in the normal voice communications band, (0.3–3kHz). The signals are translated in a manner such that they maintain their original phase relationships which contained the positional information. The translated signals are summed along with the voice communication signals and transmitted therewith on the normal communications transmitter of the mobile unit to a central receiving location. At the central receiving location, the signals are processed to provide a positional readout in accordance with their phasal relationships, this readout being indicative of the position of the mobile unit.

Figure 1:
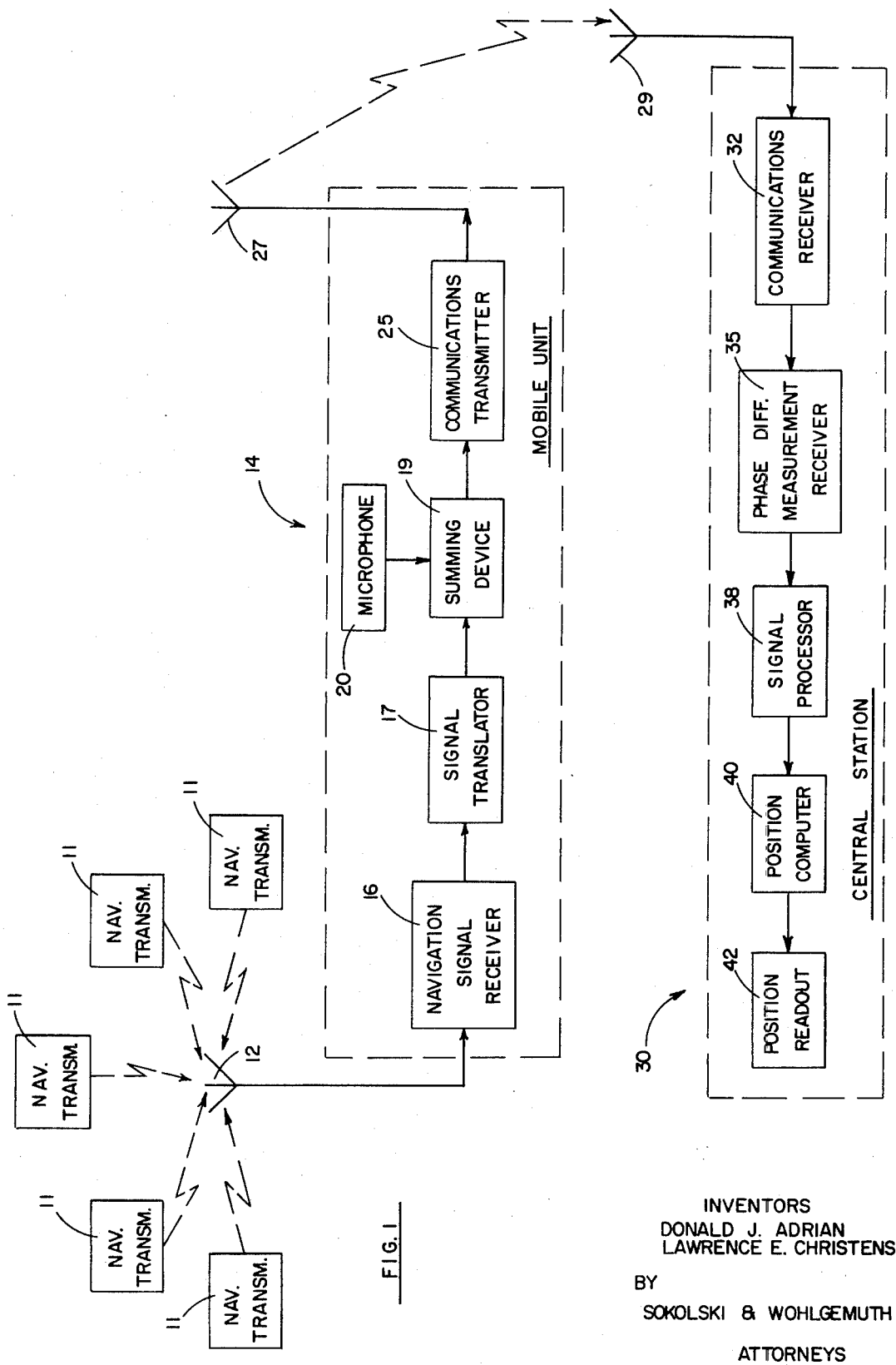
FIG. 1 is a schematic drawing illustrating the system of the invention.

Referring now to FIG. 1, a block diagram of the system of the invention is shown. A plurality of radio navigation signals transmitted by fixed navigation transmitters 11 located at separated locations are received by the antenna 12 of a mobile unit 14 whose position is to be determined. The navigation transmitters 11 may be part of a regularly established long range navigation network such as the Decca, Omega, or Loran system. The position of mobile unit 14 can be ascertained by determining the phase relationships between the various signals received at the mobile location from the various navigation transmitters.

The signals are fed from antenna 12 to a navigational signal receiver 16 where they are separated by means of band pass filters and fed to signal translator 17. Signal translator 17, as to be explained fully in connection with FIG. 2, translates the signals from their original frequencies to low audio frequencies within a normal voice communication channel (0.3–3kHz). This translation is accomplished without changing the original phase relationships between the various signals. The audio signals are fed from signal translator 17 to summing device 19 where they are summed with the voice communication audio signals received from microphone 20. The voice communication signals combined with the translated navigational signals are fed from summing device 19 to communications transmitter 25, providing the modulation signals therefor.

It is to be noted that communications transmitter 25 may be the normal conventional communications transmitter utilized in the mobile unit and requires no modification whatsoever to its circuitry, summing device 19 being an external unit interposed between the microphone and the microphone input jack of the transmitter. The navigational signals thus are received at the mobile unit 14, translated to a low frequency and combined with a normal voice communication signal transmitted from this unit to central station 30.

The signals from communications transmitter 25 are radiated from antenna 27 and are received on the antenna 29 of communications receiver 32 at central station 30. The audio output of communications receiver 32 is fed to phase difference measurement receiver 35. These signals are separated into their separate components by means of band pass filters in the phase measurement receiver 35 and converted down to a common frequency. The common frequency signals are then compared with each other in phase detectors where DC signals are developed in accordance with these various phase relationships, these DC signals being indicative of the position of the mobile unit.

The analog output signals of phase difference measurement receiver 35 are fed to signal processor 38 where they are appropriately processed for utilization in position computer 40. Signal processor 38 may comprise an analog to digital converter for converting the signals to digital form. The processed signals are fed from signal processor 38 to position computer 40, where the position of the mobile unit is computed, this positional information being fed to position readout 42 whereon a readout, which may for example be in the form of a position track on a map type display panel, is derived. In this manner, positions of a plurality of mobile units in the field can be displayed each time communications are established with such units from a central station.

Figure 2:
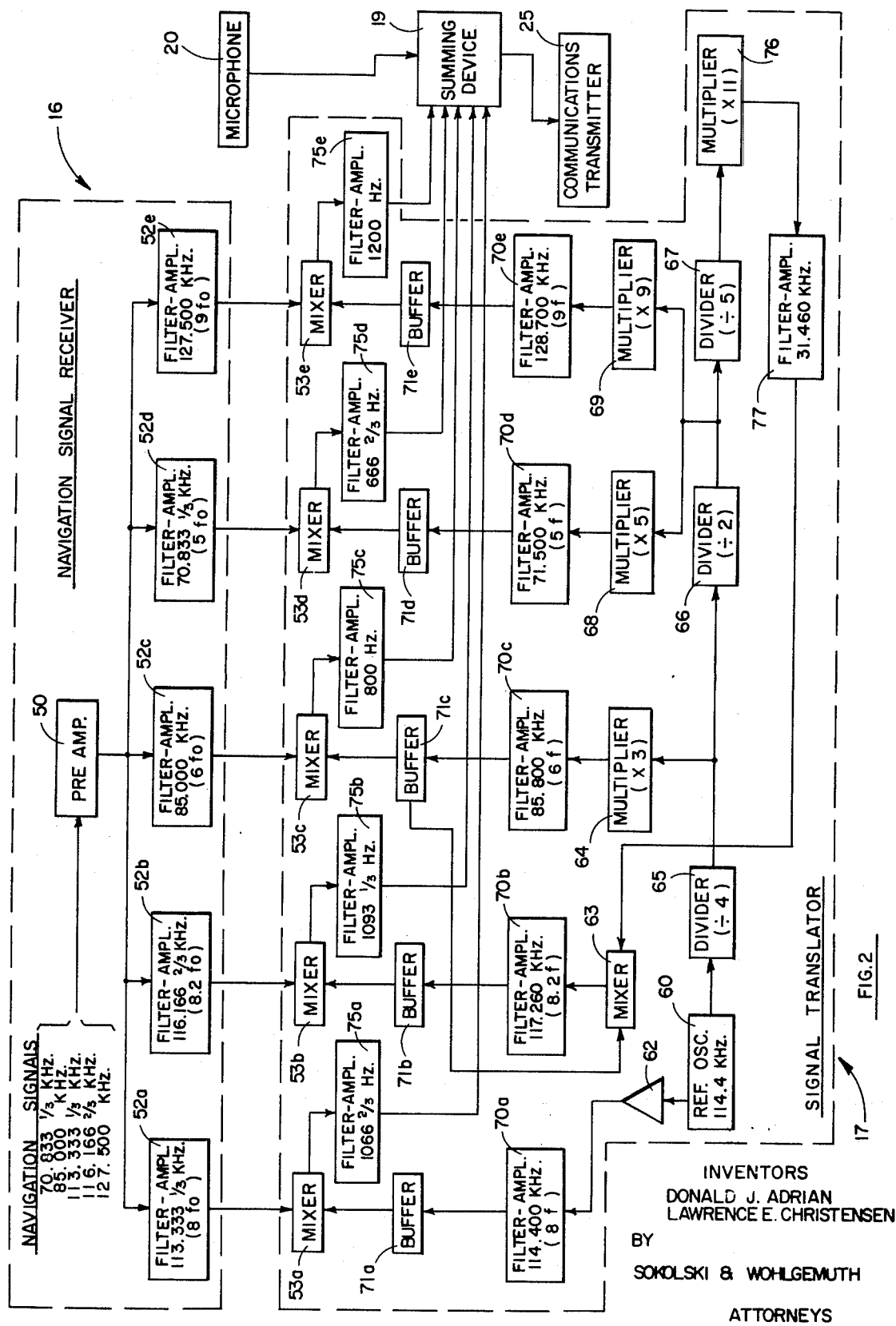
FIG. 2 is a schematic drawing illustrating the mobile unit receiver and translator of one embodiment of the system of the invention.

Referring now to FIG. 2, one embodiment of a navigation signal receiver and signal translator for use in the system of the invention is schematically illustrated. This one embodiment is described for use with a set of Decca navigational signals for illustrative purposes. Obviously, however, different types of navigational signals can be processed in the same general manner described to equal advantage. In the illustrative example, five navigational signals transmitted from separate locations are at the following frequencies: 70.833⅓ kHz, 85.000 kHz, 113.333⅓ kHz, 116.166⅔ kHz, and 127.500 kHz. These navigational signals are fed to low frequency wide band preamplifier 50 of navigation signal receiver 16.

The output of low frequency preamplifier 50 is fed to each of filter amplifiers 52a–52e. Each of these filter-amplifiers is tuned to a separate one of the navigational frequencies as indicated in each of boxes 52a–52e. For convenience of explanation, these frequencies are also designated at a multiple of $f_o$ where $f_o$ equals 85.000kHz/6. The outputs of each of filter amplifiers 52a–52 are fed to an associated mixer 53a–53e respectively. The reference oscillator 60 provides a signal output at a frequency for the example in question of 114.4kHz. This oscillator may be a crystal controlled oscillator. For the convenience of explanation, a reference frequency $f$ for describing the various local oscillator frequencies fed to the various mixers is utilized. The frequency, $f$, equals 14.3 kHz. Thus, the reference oscillator signal is at a frequency of 114.4 kHz which is $8f$.

The output of oscillator 60 is amplified by means of amplifier 62 and from this amplifier fed to filter amplifier 70a. The output of oscillator 60 is appropriately divided by means of dividers 65, 66 and 67, as indicated in each of the boxes 65–67, respectively. The output of divider 65 is multiplied by three times in multiplier 64 to provide a signal to filter amplifier 70c, while the output of divider 66 is multiplied by multipliers 68 and 69 to provide signals to filter amplifiers 70d and 70e respectively. The output of divider 67 is multiplied by 11 in multiplier 76 and fed through filter amplifier 77 to mixer 63. Mixer 63 also receives a signal at 85.8 kHz from buffer 71c and mixes this signal with the 31.46 kHz output of filter-amplifier 77 to produce a 117.260 kHz signal for filter-amplifier 70b.

Each of band pass filters 70a–70e receives a local oscillator signal as indicated in FIG. 2. These local oscillator signals are each fed through an associated one of buffers 71a–71e to an associated one of mixers 53a–53. The local oscillator signals fed from the buffers 71a–71e are higher in frequency than each of the signals received by the mixer from one of associated filters 52a–52e. This results in difference frequencies which are fed as outputs of each of mixers 53a–53e through an associated one of band pass filters 75a–75e, to summing device 77, where they are summed together. It is to be noted that for the particular example shown, the difference frequency outputs of mixers 53a–53 are 1066⅔ Hz, 1093⅓ Hz, 800 Hz, 666⅔ Hz, and 1200 Hz, respectively. As already noted in connection with FIG. 1, these signals are summed with the audio output of microphone 20 in summing device 19 and utilized as the audio modulation signal for transmitter 25.

The phase relationships between the received navigational signals are accurately maintained by virtue of the fact that each of the signals is translated down to the new frequency by the same relative factor. It is further to be noted that the particular translator shown in FIG. 2 is peculiarly adapted to a particular set of Decca navigation signals and that with other Decca signals and with Omega or Loran type signals, different translating circuitry would be utilized. However, it should be apparent to one skilled in the art how such translation could be achieved for each particular set of navigation signals in accordance with the basic techniques disclosed herein.

Figure 3:
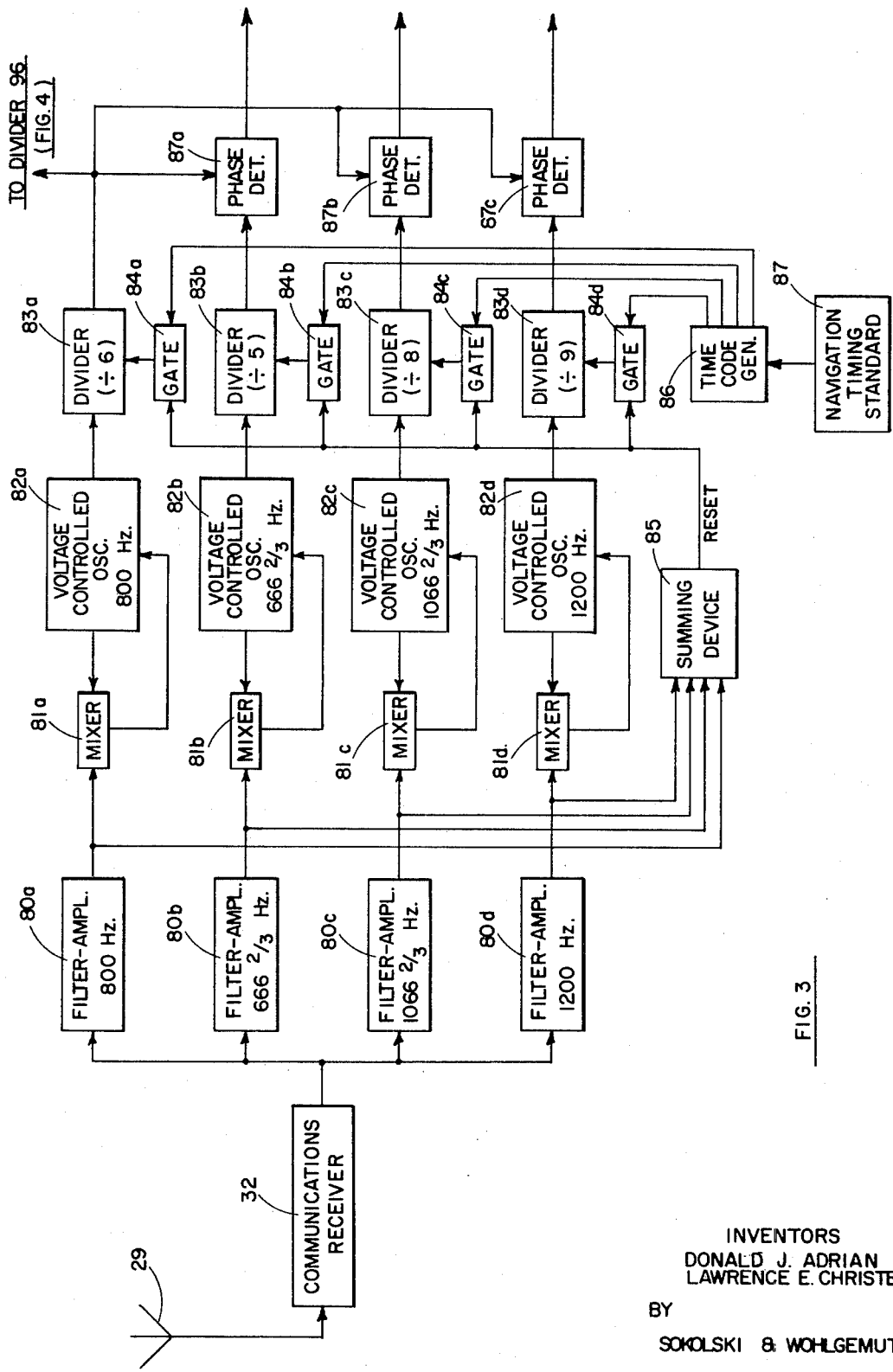
FIG. 3 is a schematic drawing illustrating one embodiment of central station receiving equipment which may be utilized in the system of the invention.

Referring now to FIG. 3, one embodiment of a phase difference measuring receiver for obtaining intermediate position resolution information at the central station 30 of FIG. 1 is illustrated. This particular phase measuring receiver is for operation in the reception of the particular set of Decca signals received from the apparatus described in the example of FIG. 2.

The signals transmitted by transmitter 25 are received on communications receiver 32 and fed to filter-amplifiers 80a–80d. These band filters are tuned to 800 Hz, 666⅔ Hz, 1066⅔ Hz, and 1200 Hz respectively. The outputs of each of filters 80a–80d are fed to a respective one of mixers 81a–81d respectively. Mixers 81a–81d each are connected to drive an associated one of voltage controlled oscillators 82a–82d. The outputs of voltage controlled oscillators 82a–82d are each fed to a respective one of dividers 83a–83d, these dividers dividing the frequencies of their associated signals to a common frequency for all (133⅓ Hz). The outputs of dividers 83a and 83b are compared in phase detector 87a, the outputs of dividers 83a and 83c are compared in phase detector 87b, and the outputs of dividers 83a and 83d are compared in phase detector 87c. The outputs of phase detectors 87a–87c are DC voltages in accordance with the phase relationships between the compared signals which, as already noted, are for the illustrative example at the common frequency of 133⅓ cycles. The phase relationships between these various signals are indicative of the position of the mobile unit which can readily be deciphered from Decca navigational system navigational information for the particular illustrative example shown, or in the case of other navigational systems, from information relative to such systems.

Gates 84a–84d, in conjunction with time code generator 86, operate to provide a reset signal to each of dividers 83a–83d in response to the output of summing device 85, this reset signal being provided periodically to uniquely phase synchronize the dividers with the input signals from filter-amplifiers 80a–80d. The time code generator operates in response to signals associated with the navigation system received from navigation timing standard 87.

Figure 4:
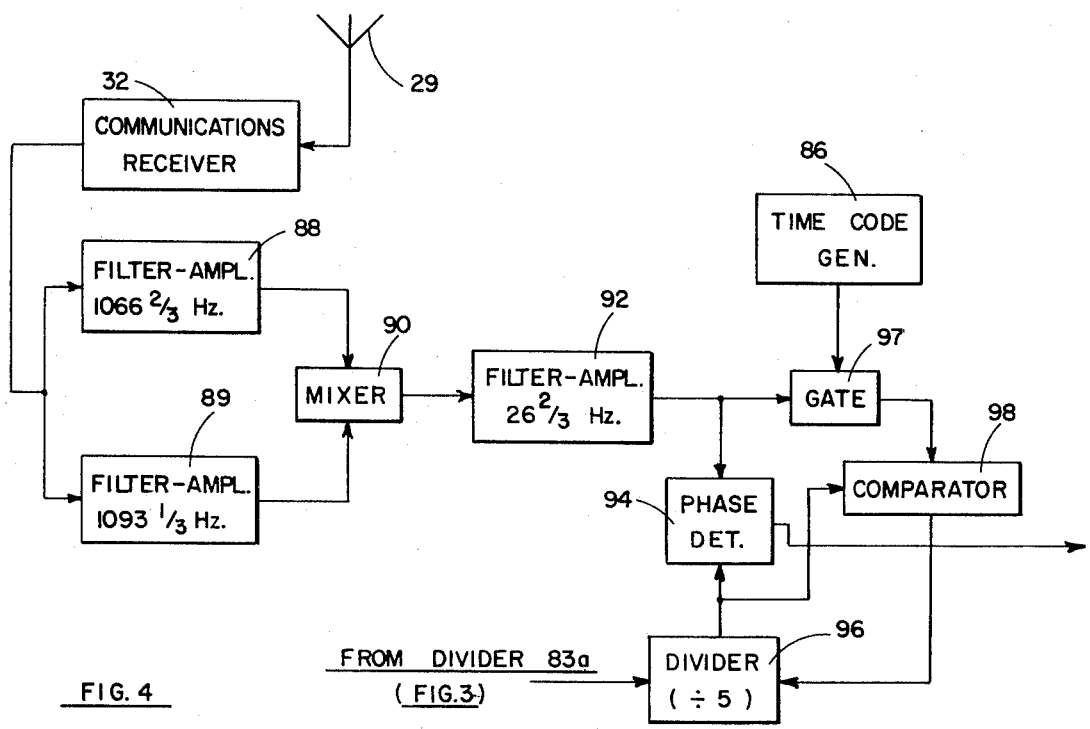
FIG. 4 is a schematic drawing illustrating further central station receiving equipment of the system of the invention.

Referring now to FIG. 4, circuitry for providing coarse positional information for the particular Decca system illustrative example is shown. Signals at 1066⅔ Hz. and 1093⅓ Hz. are filtered out by means of filter amplifiers 88 and 89, respectively, these filter amplifiers receiving the output of communications receiver 32. The outputs of the filter amplifiers are fed to mixer 90 where a difference signal of 26⅔ Hz. is developed. This difference signal is filtered out from the output of mixer 90 by means of filter amplifier 92. The output of filter amplifier 92 is fed to phase detector 94. Divider 96 receives a signal from divider 83a (see FIG. 3) and divides this signal by 5 to provide a signal at 26⅔ Hz. for comparison in phase detector 94 with the signal received thereby from filter amplifier 92. As these two signals are developed from radio signals transmitted from different locations in the navigation system, their phase relationship as determined in phase detector 94 represents the location of the mobile unit. The output of phase detector 94 is a coarse indicator of position showing the general area in which the mobile unit is located, the outputs of phase detectors 87a–87c described in connection with FIG. 3 providing more precise information as to location. Gate 97, comparator 98 and time code generator 86 operate to provide a reset signal to divider 96, this reset signal being provided periodically to uniquely phase synchronize the output of divider 96 with the output signal of filter-amplifier 92. The synchronization takes place only when the gating signal from time code generator 86 appears.

It is to be noted that the circuitry described in connection with FIGS. 2–4 is peculiarly adapted to operate with a particular set of Decca navigational signals and the operation of this circuitry is based on that of a well-known Decca navigation system. Other types of processing circuitry would of course be utilized with signals from different types of navigational systems, this being one particular example of how such a set of signals can be utilized in the system of the invention.

Figure 5:
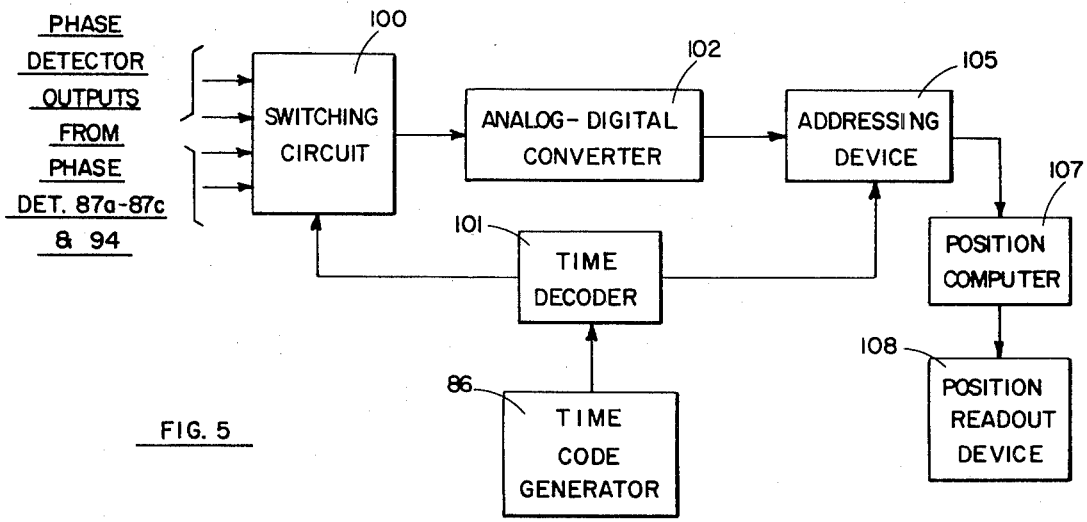
FIG. 5 is a schematic drawing illustrating one embodiment of display and readout equipment which may be utilized with the device of the invention.

Referring now to FIG. 5, a functional block diagram illustrates how the analog outputs of the phase detectors indicative of the desired positional information may be processed. Various phase detector output signals from phase detectors 87a–87c and 94 are fed to switching circuit 100 in parallel. Switching circuit 100 sequentially feeds each of the input signals fed thereto to analog-digital converter 102. Switching circuit 100 is operated in response to control signals fed from time decoder 101 which operates the response to time code generator 86. Analog-digital converter 102 converts the analog signals to digital form and feeds them to addressing device 105. The operation of addressing device 105 is synchronized with time decoder 101 to assure proper correlation of the signals received thereby with the signals sequentially fed out from switching circuit 100. The output of addressing device 105 is fed to position computer 107 where the additional signals are utilized to compute the positions of the mobile units. The computed positional information is fed to position readout device 108 to provide an appropriate readout on a map display cathode ray tube, or a printout indicating the positional coordinates of such units.

The computation of the positional information from the digital signals indicative of the phase relationships between the various navigational signals can be readily achieved by techniques well known in the art and therefore need not be described herein.

The system of this invention thus provides means for obtaining a positional readout at a central station of the location of mobile units, this end result being achieved using relatively simple and inexpensive equipment on the mobile field units, information as to position being transmitted from such units in a normal voice communication channel on the normal communications transmitter of such units.

We claim:

1. A system for providing information at a central station of the position of a mobile unit comprising:
   a plurality of radio transmitters located at fixed predetermined separated locations for transmitting radio navigational signals,
   receiver means at said mobile unit for receiving said navigational signals, translator means at said mobile unit for translating said signals to frequencies in the low frequency audio range suitable for transmission in a normal voice communications channel, said translator means comprising means for providing a plurality of reference signals having different frequencies and predetermined phases, said signals each differing in frequency from one of said navigational signals by one of said frequencies in the low frequency audio range and means for mixing each of said reference signals with a corresponding one of said navigational signals to generate said signals in the low frequency audio range, a communications transmitter at said mobile unit, means for modulating said transmitter with the output of said translator means, means at said central station for receiving said signals transmitted by said communications transmitter, and means at said central station for processing the output of said central station receiving means to provide a readout of the position of said mobile unit in accordance with the phasal relationships between said signals.

2. The system of claim 1 and further including means for generating communications signals, and means for summing the output of said translator means with said communications signals, the output of said summing means being fed to said modulating means to provide a modulation signal for said communications transmitter.

3. The system of claim 1 wherein said means for providing a plurality of reference signals comprises a reference oscillator, a plurality of divider means for dividing the output of said oscillator by different predetermined factors, and multiplier means for multiplying the outputs of said divider means by predetermined factors.

4. The system of claim 1 wherein said receiver means includes filter means for separating said navigational signals from each other.

5. The system of claim 1 wherein said processing means at said central station comprises means for bringing the outputs of said central station receiving means to substantially the same frequency, and means for generating positional output signals in accordance with the phase relationships between said last mentioned converted outputs.

6. The system of claim 5 wherein said processing means further includes means for converting the positional output signals to digital signals, computer means for computing the positional information represented by said digital signals and means for providing a readout in response to the output of said computing means.

7. In a system for providing information at a central station of the position of a mobile unit, said system including a plurality of transmitters located at fixed predetermined spaced locations for transmitting radio navigational signals, receiver means at said mobile unit for receiving the navigational signals, a radio transmitter at said mobile unit for transmitting voice communications signals, said receiver means at said central station for receiving signals from said mobile unit radio transmitter, the improvement comprising:

translator means at said mobile unit for translating the signals received by said receiver means to frequencies in the low frequency audio range suitable for transmission in a voice communications channel, said translator means comprising a reference oscillator, a plurality of divider and multiplier means for dividing and multiplying the output of said reference oscillator by different predetermined factors to provide a plurality of reference signals having predetermined phases determined by the phase of said oscillator, the frequencies of said signals each differing in frequency from one of said navigational signals by one of said frequencies in the low frequency audio range, and means for mixing each of said reference signals with a corresponding one of said navigational signals to generate said signals in the low frequency audio range, means for summing the output of said translator means with said communications signals, modulator means for modulating said mobile unit radio transmitter with the output of said summing means, and means at said central station for processing the output of said central station receiver means to provide a readout of the position of said mobile unit in accordance with the phase relationships between said signals.

8. The system of claim 7 wherein said receiver means includes filter means for separating said navigational signals from each other.

9. The system of claim 7 wherein said processing means at said central station comprises means for converting the outputs of said central station receiving means to substantially the same frequency, and means for generating positional output signals in accordance with the phase relationships between said last mentioned converted outputs.

10. The system of claim 9 wherein said processing means further includes means for converting the positional output signals to digital signals, computer means for computing the positional information represented by said digital signals and means for providing a readout in response to the output of said computing means.

* * * * *